United States Patent
Donald et al.

(10) Patent No.: US 8,046,014 B2
(45) Date of Patent: *Oct. 25, 2011

(54) MANAGEMENT OF MESSAGES INCLUDED IN A MESSAGE THREAD DISPLAYED BY A HANDHELD DEVICE

(75) Inventors: Richard J. Donald, San Jose, CA (US); David L. Williams, Belmont, CA (US); David J. Matiskella, San Francisco, CA (US); Isabel Ge Mahe, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/616,091

(22) Filed: Nov. 10, 2009

(65) Prior Publication Data

US 2010/0048231 A1 Feb. 25, 2010

Related U.S. Application Data

(63) Continuation of application No. 10/759,597, filed on Jan. 15, 2004, now Pat. No. 7,620,407.

(60) Provisional application No. 60/455,178, filed on Mar. 16, 2003, provisional application No. 60/479,392, filed on Jun. 17, 2003.

(51) Int. Cl.
*H04W 4/00* (2009.01)
*G06F 15/16* (2006.01)

(52) U.S. Cl. .................... 455/466; 709/206

(58) Field of Classification Search .......... 455/466, 455/422.1; 379/265.08, 265.01, 93.24, 100.08, 379/265.09; 709/206; 358/402
See application file for complete search history.

(56) References Cited

U.S. PATENT DOCUMENTS

| | | | |
|---|---|---|---|
| 5,333,266 A | 7/1994 | Boaz et al. | |
| 5,708,655 A | 1/1998 | Toth et al. | |
| 5,901,211 A | 5/1999 | Dean et al. | |
| 6,055,510 A | 4/2000 | Henrick et al. | |
| 6,061,346 A | 5/2000 | Nordman | |
| 6,304,636 B1 | 10/2001 | Goldberg et al. | |

(Continued)

FOREIGN PATENT DOCUMENTS

EP 1117185 A1 7/2001

(Continued)

OTHER PUBLICATIONS

"Contact Center Software", Retrieved at<<http://www.genesyslab.com/products/contact_center_software.asp>>, Sep. 26, 2008, p. 1.

(Continued)

*Primary Examiner* — Christopher M Brandt

(57) ABSTRACT

The present invention determines which messages to display in message threads to a user. An electronic communication device receives and stores numerous SMS messages transported through an SMS network, but the SMS messages are sent without explicit linking information such as a previous message or subject line. A threading module applies threading rules to determine which messages to correlate into an SMS message thread through implicit link information. The threading rules thread outgoing messages sent in response to an incoming message from a user, or incoming messages where a previous outgoing message was sent to the user. An SMS application displays threads in a user interface and indicates messages threads with an icon in one view, and displays an expanded message thread in another view.

32 Claims, 13 Drawing Sheets

U.S. PATENT DOCUMENTS

| | | | |
|---|---|---|---|
| 6,304,753 B1 | 10/2001 | Hartmaier | |
| 6,330,589 B1 | 12/2001 | Kennedy | |
| 6,463,154 B1 | 10/2002 | Patel | |
| 6,532,368 B1 | 3/2003 | Hild et al. | |
| 6,584,323 B1 * | 6/2003 | Son | 455/466 |
| 6,628,938 B1 | 9/2003 | Rachabathuni et al. | |
| 6,633,761 B1 | 10/2003 | Singhai et al. | |
| 6,658,254 B1 | 12/2003 | Purdy et al. | |
| 6,671,735 B1 | 12/2003 | Bender | |
| 6,751,453 B2 | 6/2004 | Schemers et al. | |
| 6,763,235 B2 | 7/2004 | Imai | |
| 6,778,644 B1 | 8/2004 | Jenkins et al. | |
| 6,941,134 B2 * | 9/2005 | White | 455/418 |
| 6,973,299 B2 | 12/2005 | Apfel | |
| 7,103,372 B1 * | 9/2006 | Kupsh | 455/466 |
| 7,127,058 B2 | 10/2006 | O'Connor et al. | |
| 7,315,613 B2 | 1/2008 | Kleindienst et al. | |
| 7,328,242 B1 | 2/2008 | McCarthy et al. | |
| 7,346,150 B2 | 3/2008 | Frifeldt et al. | |
| 7,383,307 B2 | 6/2008 | Kirkland et al. | |
| 7,421,690 B2 | 9/2008 | Forstall et al. | |
| 7,430,409 B2 | 9/2008 | Klassen et al. | |
| 2001/0025309 A1 * | 9/2001 | Macleod Beck et al. | 709/223 |
| 2002/0016735 A1 | 2/2002 | Runge et al. | |
| 2002/0107925 A1 * | 8/2002 | Goldschneider et al. | 709/206 |
| 2003/0005058 A1 | 1/2003 | Sorotzkin et al. | |
| 2003/0033582 A1 | 2/2003 | Klein et al. | |
| 2003/0070176 A1 | 4/2003 | Parker et al. | |
| 2003/0083078 A1 * | 5/2003 | Allison et al. | 455/466 |
| 2003/0114174 A1 * | 6/2003 | Walsh et al. | 455/466 |
| 2003/0135574 A1 | 7/2003 | Burg et al. | |
| 2003/0185379 A1 * | 10/2003 | O'Connor et al. | 379/265.02 |
| 2004/0075691 A1 | 4/2004 | Moon | |
| 2004/0088359 A1 * | 5/2004 | Simpson | 709/206 |
| 2004/0137884 A1 | 7/2004 | Engstrom et al. | |
| 2004/0185883 A1 * | 9/2004 | Rukman | 455/466 |
| 2004/0266411 A1 | 12/2004 | Galicia et al. | |
| 2005/0043036 A1 | 2/2005 | Ioppe et al. | |
| 2005/0043037 A1 | 2/2005 | Ioppe et al. | |
| 2006/0013368 A1 | 1/2006 | LaBaw | |
| 2006/0166650 A1 | 7/2006 | Berger et al. | |
| 2007/0005715 A1 | 1/2007 | LeVasseur et al. | |
| 2008/0037721 A1 | 2/2008 | Yao et al. | |
| 2008/0104173 A1 | 5/2008 | Wilcox et al. | |
| 2008/0172462 A1 | 7/2008 | Carrer et al. | |

FOREIGN PATENT DOCUMENTS

WO   WO 2008/030937 A2   3/2008

OTHER PUBLICATIONS

"CosmoCall Universe", Retrieved at<<http://www.cosmocom.com/productinfo/CollateralMaterials/CosmoCallAgentFeatures.pdf>>, pp. 2.

Ghauri, I. et al., "Blind Channel Identification and Projection Receiver Determination for Multicode and Multirate Situations in DS-COMA Systems," IEEE XP-002233922, pp. 2197-2200, 2000.

"PeopleSoft 8: Web-based Applications Armada", Retrieved at<<http://findarticles.com/p/articles/mi_qa3973/is_200009/ai_n8922878>>, Sep. 26, 2008, pp. 5.

"Siemens HiPath ProCenter Multimedia", Retrieved at<<http://health.siemens.com/portfolio/documents/comm_infrastr/contact_centers/hipath_procenter.pdf>>, pp. 5.

Tripathi, V. et al., "Multiple Access Interference Resistant Channel Acquisition for Wideand COMA Signals," IEEE, pp. 956-960, 2000.

"Zimbra Email", Retrieved at<<http://www.hmc.edu/about/administrativeoffices/cis1/docs1/central1/email1/zimbra1/email.html>>, Sep. 26, 2008, pp. 6.

* cited by examiner

600

| Active Thread Reference No. | Incoming or Outgoing | Identification | Timestamp | Text |
|---|---|---|---|---|
| - | Outgoing | Richard | 03:05.32 | LOL |
| 2 | - | (312) 555-1782 | - | -- |
| 1 | - | Ana | - | -- |

| Active Thread Reference No. | Incoming or Outgoing | Identification | Timestamp | Text |
|---|---|---|---|---|
| 1 | Incoming | Ana | 02:00.15 | Confirmed for the .. |
| 1 | Outgoing | Ana | 05:06.29 | See you then unless .. |
| 2 | Outgoing | (312) 555-1782 | 2:12.01 | No she didn't! |
| 2 | Outgoing | (312) 555-1782 | 12:01.00 | Yes she did |

| Source Address 810 | Destination Address 820 | SMSC Address 830 | Time Stamp 840 | Encoding Type 850 | Text Message 860 |
|---|---|---|---|---|---|

FIG. 8

MANAGEMENT OF MESSAGES INCLUDED IN A MESSAGE THREAD DISPLAYED BY A HANDHELD DEVICE

CROSS-REFERENCE TO RELATED APPLICATIONS

This application is a continuation of U.S. patent application Ser. No. 10/759,597, entitled "SMS Threading," which was filed on Jan. 15, 2004, and which claims priority under 35 U.S.C. §119(e) to U.S. Provisional Patent Application Nos. 60/455,178, filed on Mar. 16, 2003, entitled "Handheld PDA, Telephone, and Camera," and 60/479,392, filed on Jun. 17, 2003, entitled "Communicator," the disclosures of each of which are incorporated by reference herein in their entirety.

BACKGROUND

1. Field

This invention relates generally to network messaging applications and, more specifically, to correlating messages received in network messaging applications.

2. Description of Related Art

Messaging applications are the "killer apps" for networked devices. Mobile phone networks have traditionally been limited to voice communications, but new technologies such as GSM (Global System for Mobile Communications) have enabled mobile phone networks to also include data communications. For example, SMS (Short Message Service) messaging provides a software-independent protocol to send short text messages composed of either: 160-7 bit characters; 70-16 bit characters; or 140 octets of binary data. Individual SMS messages thus require a relatively small network bandwidth and devices can receive messages, even when connected to a voice call. The number of SMS messages a user receives has continually increased because many new types of network devices have joined mobile phone networks. These devices include, for example, PDAs, hybrid PDA/mobile phone devices, and other text messaging devices using GSM networks. An inherent limitation of the small SMS packet size is that neither previous messages nor subject lines are included within a current SMS message.

Because there is no inherent linking information (e.g., subject line or application session tags) in SMS messages, they are displayed as discrete interchanges without the context of related SMS messages. A user exchanging SMS messages with multiple other users can thus quickly lose track of the multiple conversations. Moreover, messages identified by phone numbers add a level of confusion. Consider a situation where User A sends a message to User B—"What time shall we meet?"—and also to User C—"How many times?" A response message of "3" identified only by the sender's phone number may leave User A wondering whether the message was from User B or from User C.

A similar problem can arise when exchanging multiple messages with a single user. Because SMS messages are held while a mobile device is not reachable, User A may not receive User B's response to a message for hours or even days. The entire conversation topic can thus span hours or days. Without the context of previous messages, User B's response may leave User A wondering what question is being answered or how the conversation started.

What is needed is a robust messaging application that solves the above constraints of mobile devices and the inherent shortcomings of their communication protocols. Furthermore, the messaging application should determine which messages to thread despite the above problems.

SUMMARY

The present invention determines which messages to display to a user as a message thread. In one embodiment, an SMS device receives and stores numerous SMS messages transported through an SMS network. SMS messages do not contain any explicit linking or relationship between the messages. Thus the SMS device must apply threading rules to determine whether to thread SMS messages by identifying implicit links. A threading engine generates an SMS message thread by applying threading rules from the outgoing SMS message rules for outgoing messages and from the incoming SMS message rules for incoming messages. An SMS application, operating independently from the threading engine, displays SMS message threads to the user.

One embodiment of the threading engine identifies related messages from implicit links between messages from a unique identifier native to SMS data packets, such as a source or destination address. The unique identifier is independent of an SMS application, or instantiations of the SMS application. In another embodiment, the SMS application assigns an application identifier to an identified message thread. As such, the source and destination SMS applications, and instantiations of the same, are capable of further communications.

In another embodiment, the threading engine applies threading rules to correlate current messages with previous messages. The threading engine appends the current message to an active thread when available. If not, the threading engine generates an SMS thread having the previous and current messages in a hierarchy according to relationships between the messages. For example, the hierarchy may represent the order of arrival of included messages, who sent each message, and/or which messages are replies to others.

In yet another embodiment, the threading rules database is organized according to outgoing message rules and incoming message rules. In another embodiment, the threading rules database is organized by interrelated set of message inclusion rules, message hierarchy rules, message formatting rules, and thread management rules. The threading rules may be predetermined and/or dynamically updated according to user configurations.

In still another embodiment, the user interface displays an icon to indicate message threads. In another embodiment, the user interface displays an expanded message thread representing message hierarchy. In yet another embodiment, the user interface displays a drop-down menu to list active threads.

BRIEF DESCRIPTION OF THE FIGURES

FIG. 6 is a table illustrating previous SMS messages as stored in the SMS message database according to one embodiment of the present invention FIG. 7 is an active thread list containing a list of active threads according to one embodiment of the present invention.

FIG. 8 is a block diagram illustrating the SMS data packet according to one embodiment of the present invention.

DETAILED DESCRIPTIONS

The present invention determines which messages to display in a message thread to a user. A "thread," as used herein, refers to a set of correlated messages. The threads are displayed to show current incoming or outgoing messages and their relationship to previous messages.

It will be understood by one of ordinary skill in the art that although the described embodiment uses an SMS messaging, the invention may also be applied to MMS (Multimedia Messaging Service), EMS (Enhanced Messaging Service), or any data protocol capable of encapsulating messages for transport between networked devices. Also, the terms "SMS messages" and "messages" are used interchangeably herein. Additionally, the terms "outgoing" and "sent" messages are used interchangeably herein, as are the terms "incoming" and "received."

Figure 1:
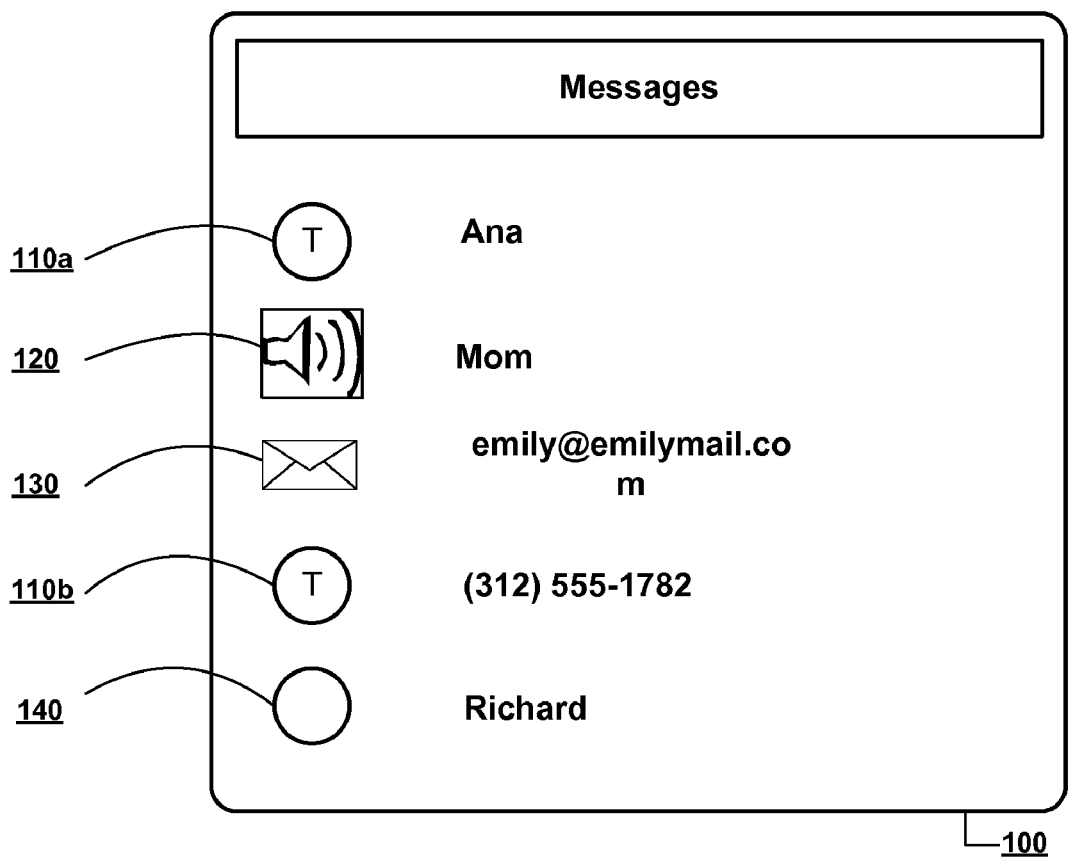
FIG. 1 illustrates a user interface of an electronic communication device that includes SMS thread icons according to one embodiment of the present invention.
Figure 3:
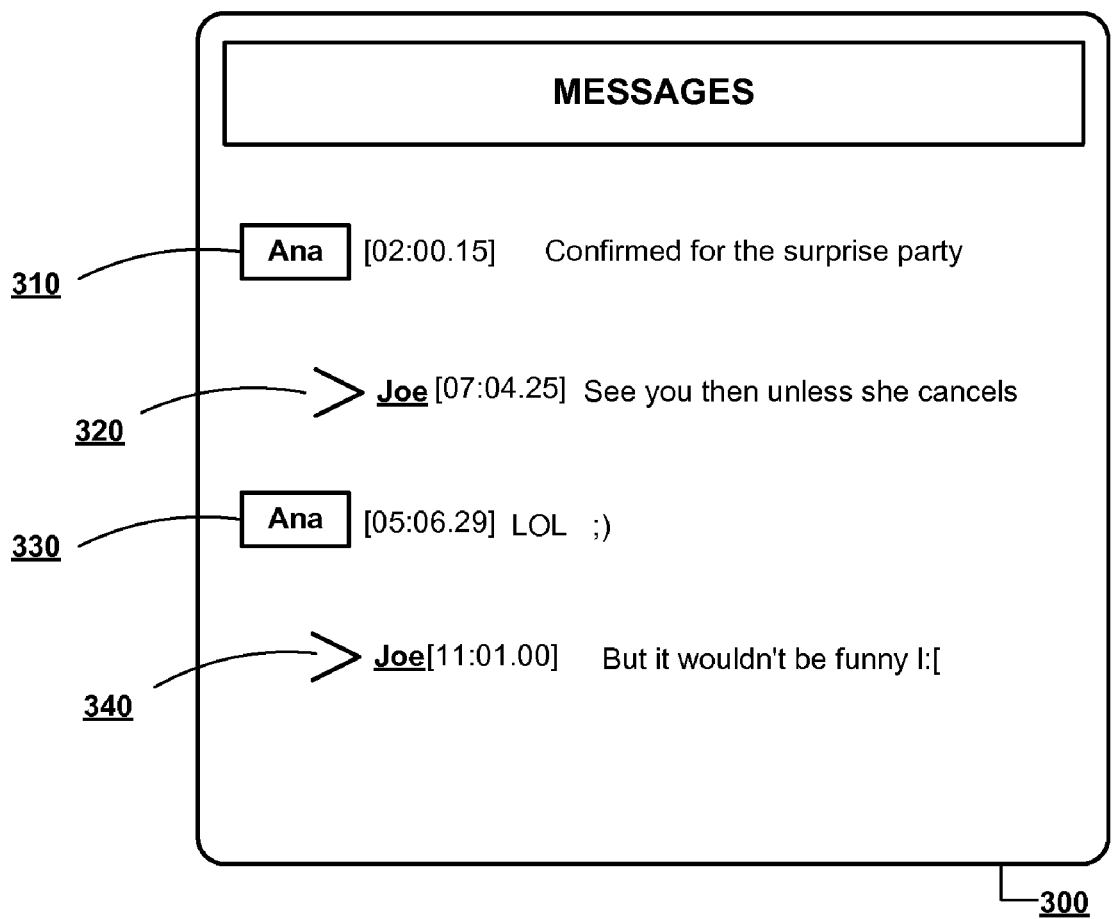
FIG. 3 illustrates a user interface including an expanded SMS thread according to one embodiment of the present invention

FIG. 1 illustrates a user interface 100 of an electronic communication device that includes SMS thread icons according to one embodiment of the present invention. The user interface 100 comprises a listing of various types of messages as indicated by accompanying icons including threaded SMS messages icons 110a,b, a voicemail message icon 120, an e-mail icon 130, and a non-threaded SMS message icon 140. To the user, the threaded SMS messages icon 110 indicates an exchange of messages with Ana and a user of phone number (312)555-1782 in contrast to the non-threaded SMS message icon 140 which is indicative of a discrete message. A user selects the threaded SMS message icon 110 to view an expanded message thread as shown in FIG. 3. Further, the threaded SMS messages icon 1210 is indicative of a message in SMS format whereas the voicemail icon 1220 and e-mail icon 1230 are indicate of messages in voicemail and e-mail respectively. In one embodiment, additional types of threaded message icons are associated with the individual messages to indicate elements within the message such as an Internet photo link. In another embodiment, the user interface 100 is dedicated to SMS message thread icons 110a,b, 140. The user interface 905 is presented to a user through an LCD, plasma, CRT, or any other display device as described further below.

Figure 2:
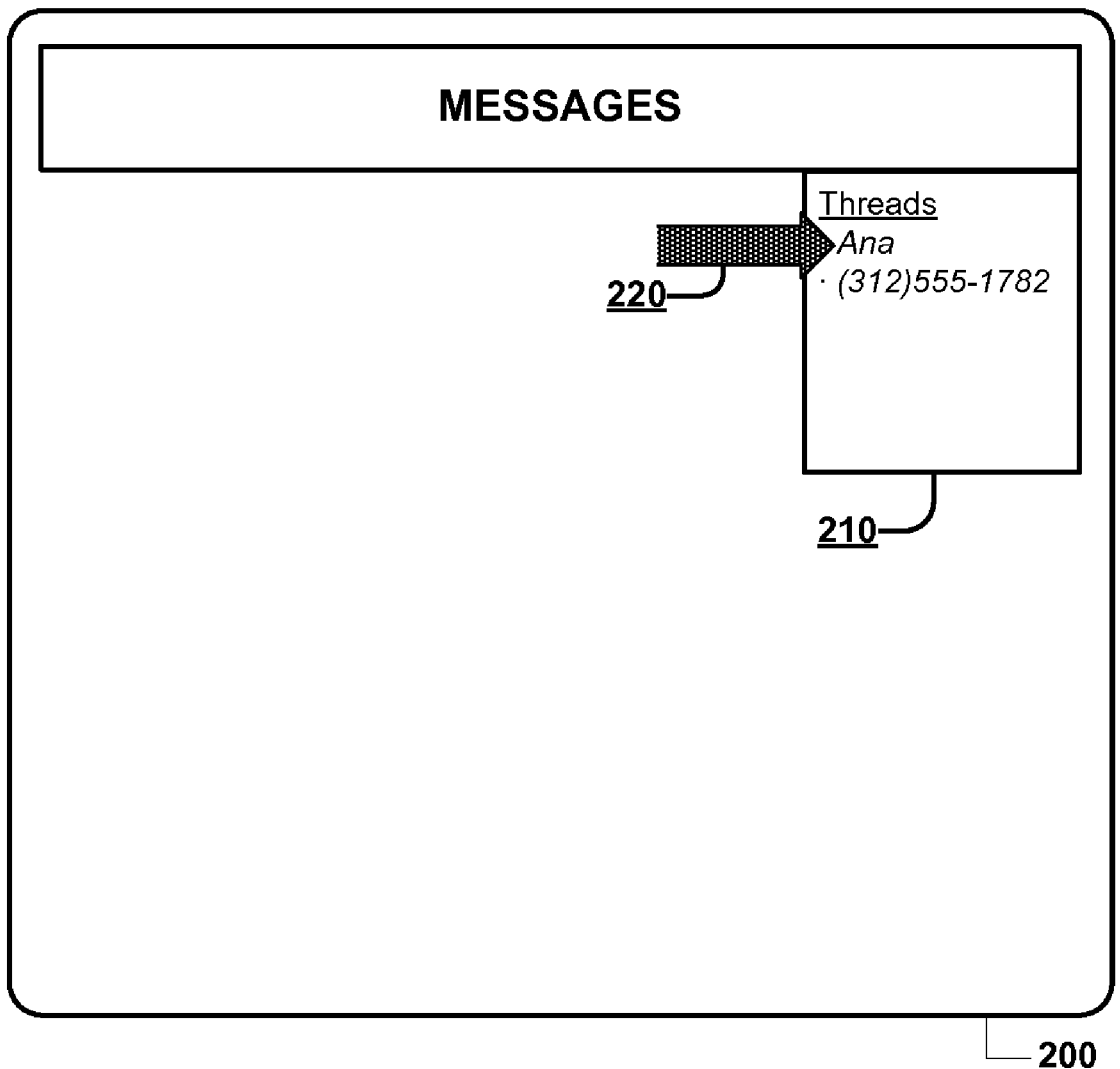
FIG. 2 is an illustration of a drop-down menu of active message threads in a user interface according to one embodiment of the present invention

FIG. 2 is an illustration of a drop-down menu 210 of active message threads in the user interface according to one embodiment of the present invention. The drop-down menu 210 includes active thread entries corresponding to a message exchange for contacts Ana and the user of phone number (312) 555-1782 as discussed above and below. The user positions cursor 220 to select and display the expanded message thread with Ana. A list of active threads as stored in memory is shown in FIG. 7.

FIG. 3 illustrates the user interface 300 including an expanded SMS thread according to one embodiment of the present invention. The expanded thread includes discrete messages 310-340. Each message includes an originator, a time stamp and a text message. The messages are organized in chronological order (i.e., message 310 sent at 02:00.15 is listed before message 320 sent at 05:06.29, etc.). The outgoing messages comprise a square icon labeled "Ana" as distinguished from the incoming messages, which comprise an arrow and underline labeled "Joe." It will be understood that various methods are used to distinguish incoming and outgoing messages.

Figure 4:
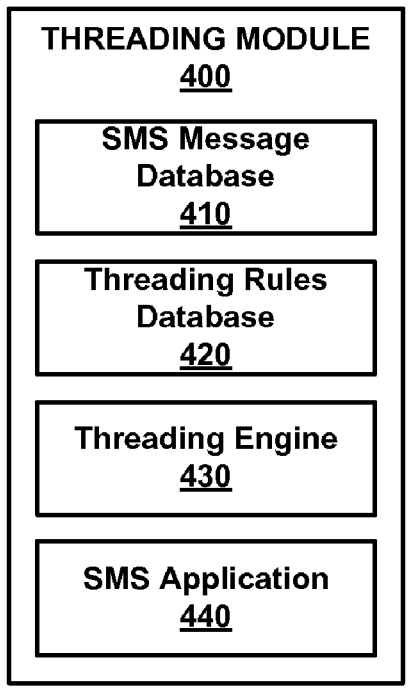
FIG. 4 is a block diagram illustrating the threading module according to one embodiment of the present invention.
Figure 15:
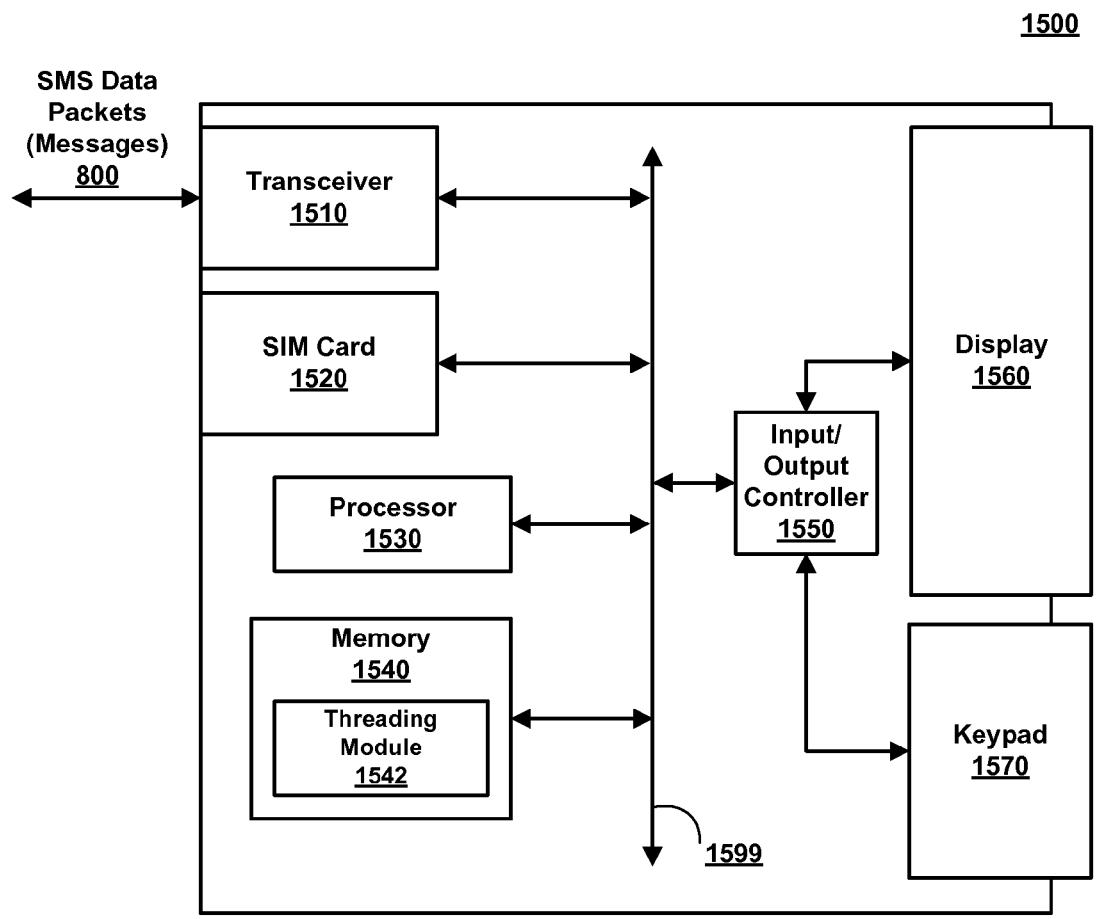
FIG. 15 is a block diagram illustrating an example electronic communication device according to one embodiment of the present invention.
Figure 16:
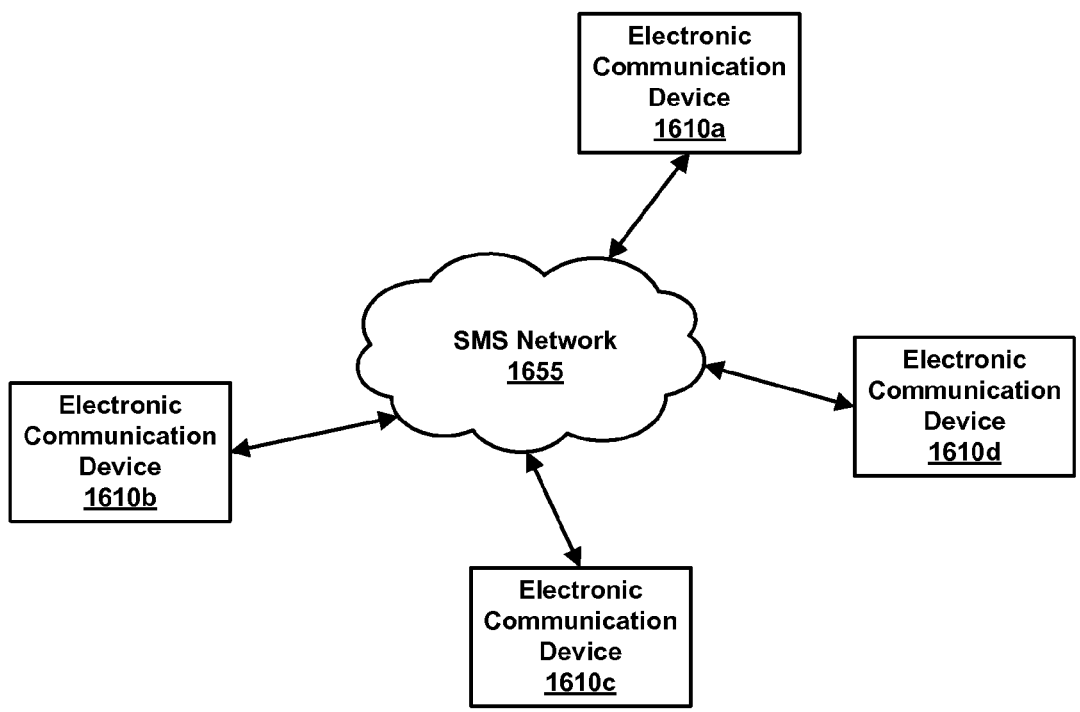
FIG. 16 is a block diagram illustrating an example system for transmitting SMS messages.

FIG. 4 is a block diagram illustrating the threading module 400 according to one embodiment of the present invention. The threading module 400 to determines which current and previous messages to correlate into threads for display to the user. The threading module 400 of FIG. 4 comprises an SMS message database 410, a threading engine 430, a threading rules database, and an SMS application 440. An operating system such as Palm OS 5 by Palm, Inc., Windows CE or Windows XP by Microsoft, or any other message passing operating system facilitates interoperability between hardware and software, and inter-process communication in the threading module 400. In one embodiment the threading module 400 is implemented in software executed in hardware as shown in FIG. 15. Other embodiments implement the threading module in hardware or firmware. Additionally, the threading module 400 is coupled to receive SMS messages from an SMS network as shown in FIG. 16.

The SMS message database 410 persistently stores incoming and outgoing SMS messages. Incoming messages are received from other SMS devices. Outgoing messages are entered into the electronic communication device by the user. The SMS message database 410 stores messages until a corresponding memory is full, a maximum number of messages has been reached, a time period has passed, or the like. If the SMS device is powered down, and then powered up again, the messages are still available for correlating into threads. By contrast, prior art systems without persistent memory are not able to recover message threads after powering down, resetting, or the like. In one embodiment, unthreaded messages are stored in format as shown in FIG. 7, and threaded messages are stored in a format as shown in FIG. 8.

Figure 5:
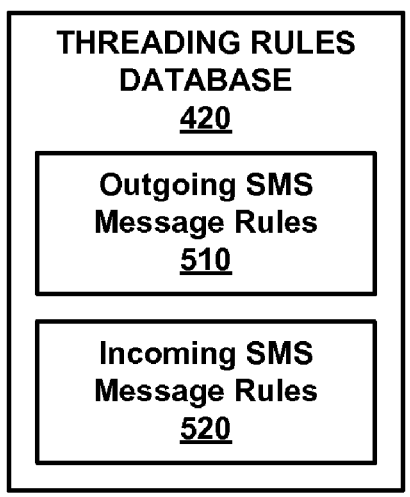
FIG. 5 is a block diagram illustrating the threading rules database according to one embodiment of the present invention.

The threading rules database 420 stores rules that characterize relationships between incoming and outgoing messages stored in the SMS message database 410. FIG. 5 is a block diagram illustrating a threading rules database according to one embodiment of the present invention. The threading rules database 420 comprises outgoing SMS message rules 510 and incoming SMS message rules 520. In one embodiment, the incoming SMS message rules 510 prevent unnecessary or unsolicited threads.

The outgoing SMS message rules 510 are applied to messages sent from the electronic communication device to determine its relationship to previous messages. Example categories of threading rules include rules that determine: thread association; the type of thread in which to include the message; previous messages to include in the thread; and thread hierarchy. One rule always threads outgoing messages sent in reply to incoming messages. Another rule only thread outgoing messages sent to devices listed in the phone book. Yet another ensures that messages older than, for example, an hour or a week, are not threaded. Also, if the last message is older than a predetermined time, a new messages are included in a new thread.

The incoming SMS message rules 520 are applied to messages received to the electronic communication device to determine its relationship to previous messages. For example, one rule limits unsolicited threads by only threading incoming messages from known users, or that are verified by the device user. A similar rule does not thread messages that originate from known spammers or commercial entities. Other do not thread rules relate to special addresses that, although are from a common source, are not desirable for threading. For example, rules detect and exclude voicemail notifications and numerical pages from a database of special addresses. Another rule attempts to thread incoming messages sent in reply to outgoing messages by assuming that any incoming message received from the destination of an outgoing message within a time limit, such as 15 minutes, is a reply. It will be understood by one of ordinary skill in the art that the outgoing and incoming threading rules 510, 520 are provided solely for the purpose of illustration and that other rules may also be included without departing from the spirit of the invention.

In FIG. 4, the threading engine 430 applies threading rules to correlate the current and previous messages into threads. In response to receiving incoming or outgoing messages, or indications of such, from the operating system, the threading engine 430 associates the current message with previous messages of the same thread. The threading engine 430 identifies the messages based on a unique identifier native to SMS packets containing the SMS message. One example of a unique identifier is the source or destination address. A thread is organized by the unique identifier, a sender's or receiver's name, a contact from a phone book, a phone number, SMS address, group affiliation, a business entity, a subject matter category, a device, a location, a message urgency, or otherwise. The threading engine 430 may find an appropriate active thread, and add the message into that thread. In another embodiment, the threading engine 430 generates a thread on-the-fly by sorting or previous messages in the SMS message database 410 to find messages of similar characteristics. The messages are then put in chronological order. In yet another embodiment, if there are no active threads or previous messages that correlate to the current message, the threading engine 430 initializes a new SMS thread. Methods related to the threading engine 430 are described in more detail below.

The SMS application 440 displays threads in a user interface and receives messages input by a user. The SMS application 440 displays a SMS messages thread icon responsive to receiving an indication that the message belongs to a thread as shown in FIG. 1. In response to selecting the threaded message icon 110 or active thread 220 from the drop down menu, the SMS application 440 displays an expanded thread as shown in FIG. 3.

The SMS application 440 may perform additional analysis on the message thread. In one embodiment, the SMS application 440 initiates a ring-tone when receiving an incoming message included in an SMS thread. In another embodiment, the SMS application 440 determines format of the message text. In yet another embodiment, the SMS application 440 receives display formats from the threading engine 430. For example, the threading engine 430 indicates separate display formats for incoming and outgoing messages, outgoing messages in progress, or otherwise.

The SMS application 440 is, for example, a network browser to view remotely stored SMS threads, an application dedicated to SMS threading, or any other messaging application that configured to send and/or receive messages (SMS and/or other types of messages) according to the present invention. In one embodiment a sending SMS application 440 is different from a receiving SMS application 440. The threading engine 430 thus threads messages independently and outputs its results through an application programming interface. Methods related to the SMS application 440 are described in more detail below.

FIG. 6 is a table 600 illustrating previous SMS messages as stored in the SMS message database according to one embodiment of the present invention. The SMS message database 410 receives information from SMS protocol packets and stores the information in the SMS message table 600. It will be understood that SMS messages can be stored in any appropriate database or data structure. The format of FIG. 6 is provided as an example format. For each stored message, the SMS message database 600 indicates: a reference number for an active thread; whether the message is incoming or outgoing; an identification of who an outgoing message is sent to or who an incoming message is received from; a timestamp; and the message text. In one embodiment, a subset of the SMS message database 410 including a list of active threads is stored separately for fast processing.

FIG. 7 is an active thread list 700 containing a list of active threads according to one embodiment of the present invention. The active thread list 700 is a list of users, etc. with whom the user is currently engaged in a threaded conversation as shown in FIG. 2, and corresponding message reference numbers or pointers to messages in the SMS message database. The active thread list 700 receives an indication and is updated when a new thread is initialized or generated on-the-fly. The active thread list 700 also receives pointer updates. In one embodiment, the active thread list 700 comprises the SMS message table 600 with a column to indicate a thread flag.

FIG. 8 is a block diagram illustrating an SMS data packet 800 according to one embodiment of the present invention. One of ordinary skill in the art will recognize that variations and enhancements of the SMS data packet 800, such as set forth by the ETSI (European Telecommunications Standards Institute) for GSM, are within the scope of the present invention. The SMS data packet 800 comprises a header with fields for a source address 810, a destination address 820, an SMSC (Short Message Service Center) or gateway address 840, a time stamp 830, an encoding or message type 850, and a text message or data payload 860. Accordingly, the source address 810 can indicate the sender of an incoming message and the destination address 820 can indicate the receiver of an outgoing message. The SMSC address 830 indicates the service center on the SMS network that forwards the SMS data packet 800 to its destination. The time stamp 840 indicates a time of dispatch from the SMSC or sending device. The payload indicates an encoding type for the data such as a number of bits and whether data is binary. The message text 840 contains up to 160 characters of a communication from sender to receiver, binary data representing a ring tone, or any other data suitable for an SMS data packet 800.

Figure 9:
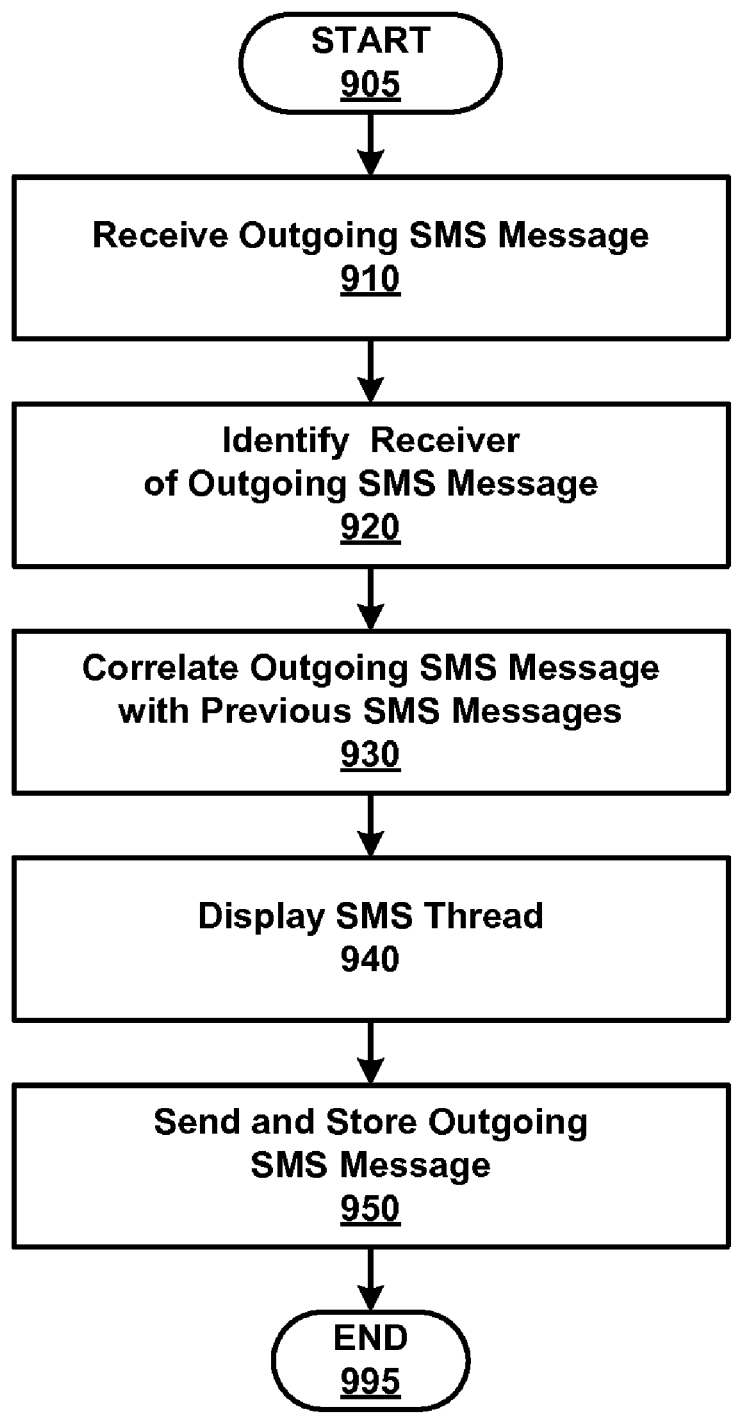
FIG. 9 is a flow chart illustrating the method of SMS threading to include an outgoing message according to one embodiment of the present invention.

FIG. 9 is a flow chart illustrating the method of SMS threading 900 to include an outgoing message according to one embodiment of the present invention. The threading module 400 initializes 905 in response to the SMS message database 410 receiving 910 outgoing SMS message, a signal from the SMS application 440, at power up, reset, or otherwise.

The threading module 400 identifies 720 the receiver of the outgoing message from, for example, a "To", "Cc", or "Bcc" field in the user interface, the SMS packet's destination address 820, or as indicated by the SMS message database 410. In one embodiment, a first identifier is the identified receiver as indicated by the receiver's name, phone number, SMS address, group affiliation, or other unique identifier. In another embodiment, a second identifier is associated with two or more first identifiers. One example of a second identifier is a phone book contact with two phone numbers, each phone number constituting a first identifier. Based on the specific implementation, two SMS threads can be generated based on the first and second phone numbers, or a single SMS thread can be generated based on the phone book contact.

The threading engine 930 correlates 730 the outgoing message with previous messages according to threading rules and outputs the resulting thread to the SMS application 440 as shown below in FIGS. 10-11.

The SMS application 440 displays 940 the resulting SMS thread in a user interface. In one embodiment, the SMS application 440 displays 940 the thread while the outgoing message is being entered. For instance, if a user selects a reply icon, the threading module 400 may assume that the current message will be sent to the same entity that the replied to message was received from and include that outgoing message in the same thread. In another embodiment, the SMS application 440 displays 940 threads after the message has been sent. The threading module 400 may also display 740 threads in circumstances other than receiving an incoming or outgoing message such as in response to selecting a user from the phone book.

In one embodiment, displaying 740 comprises a thread icon in an interface having other types of text and associated icons as shown in FIG. 1. In another embodiment, displaying 640 comprises an expanded thread of the outgoing and incoming messages as shown in FIG. 2.

The electronic communication device sends 950 the outgoing message as shown below in FIG. 16 and stores the message in the SMS message database 410.

Figure 10:
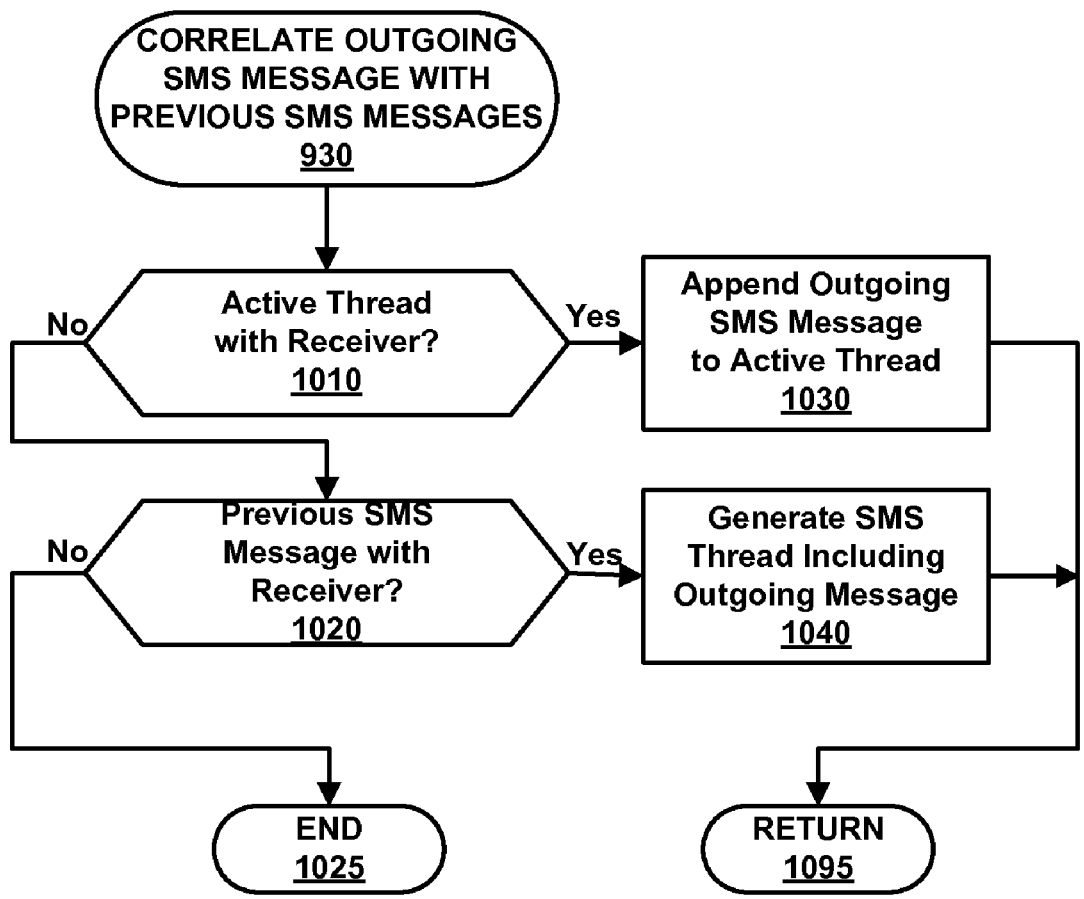
FIG. 10 is a flow chart illustrating the method of correlating an outgoing message with an SMS thread according to one embodiment of the present invention.

FIG. 10 is a flow chart illustrating the method of correlating 930 an outgoing message with an SMS thread according to one embodiment of the present invention. The threading engine 430 determines 1010 whether there is an active thread with the outgoing message's receiver. In doing so, the threading engine 430 checks the list of active threads 800 for matches with the receiver. If there is an active thread, the threading engine 430 appends 1030 the outgoing SMS message and related to the active thread.

If there is no an active thread, the threading engine 430 determines 1020 whether there are previous SMS messages sent to or received from the receiver. Accordingly, the threading engine 430 checks the SMS message database 254 to identify previous messages based on either the first or second identifier. If there are previous messages, the threading engine 430 generates 1040 an SMS thread including the outgoing message and related messages as shown in FIG. 11. If there are no previous messages, the process ends 1025.

Figure 11:
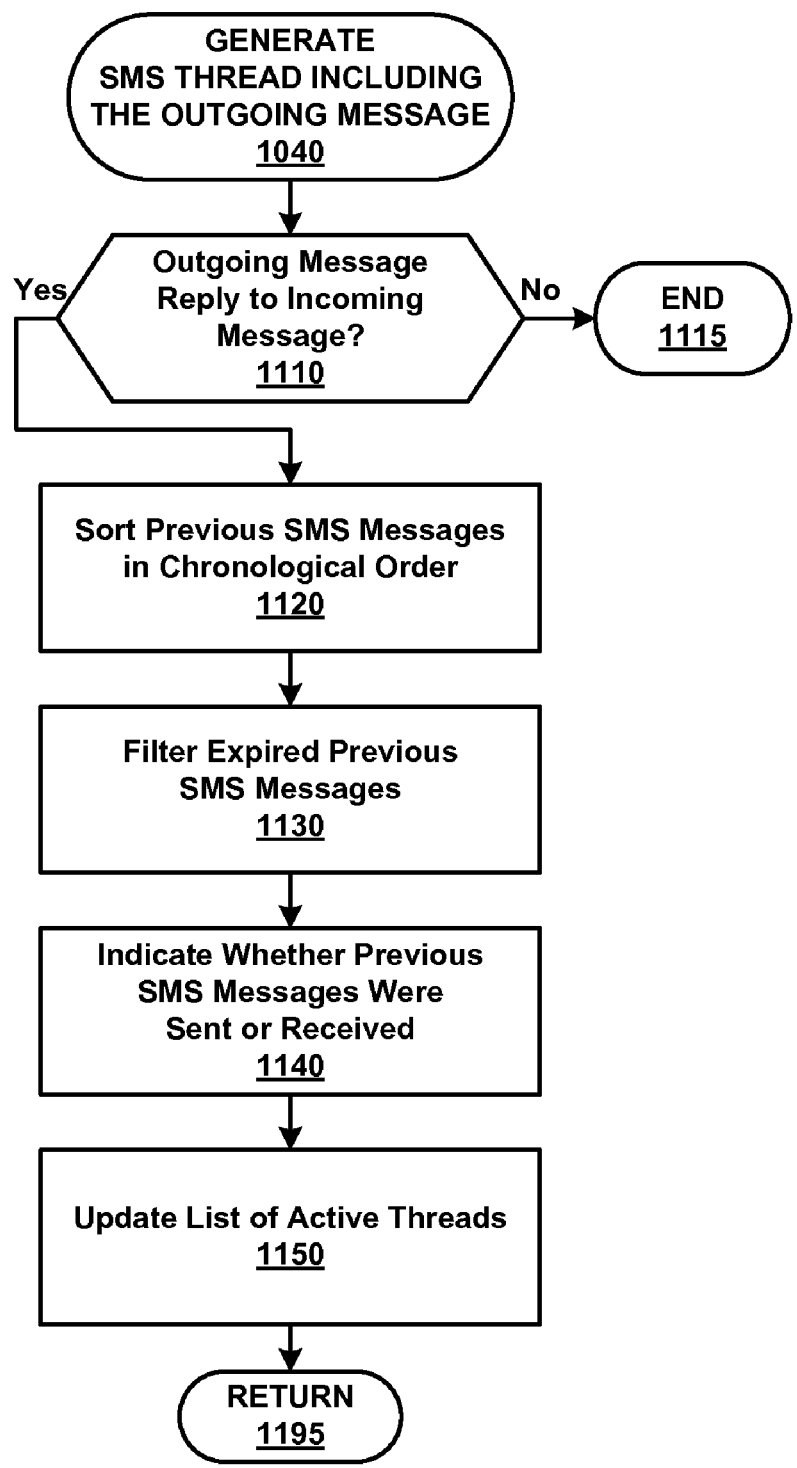
FIG. 11 is a flow chart illustrating the method of generating an SMS thread to include the outgoing message according to one embodiment of the present invention.

FIG. 11 is a flow chart illustrating the method of generating 1040 an SMS thread to include the outgoing message according to one embodiment of the present invention. In one embodiment, the threading engine 430 performs these tasks by implementing threading rules from the outgoing SMS message rules 510. It will be understood by one of ordinary skill in the art that the following threading rules are not comprehensive, but merely illustrative, and that other threading rules are within the scope of the present invention.

The threading engine 430 determines 1110 whether the outgoing message is a reply message to an incoming message. If so, the threading engine 430 continues by sorting 1120 the previous SMS messages in chronological order. In one embodiment, order of arrival to the electronic communication device determines the chronological order. In another embodiment, a time stamp at dispatch from an SMSC or sending electronic communication device determines the chronological order. In one embodiment, if the outgoing message is not a reply message, the process ends 1115.

The threading engine 430 filters 1130 expired SMS messages so that they are not included in the thread. Message expiration is determined by age, how many intervening messages have been received, or otherwise. In one embodiment, the threading engine 430 indicates 1140 whether previous SMS messages were sent or received so that the SMS application 440 can use different display formats in it's user interface. In one embodiment, the threading engine 430 updates 1150 the list of active threads 800 for faster processing of future messages.

Figure 12:
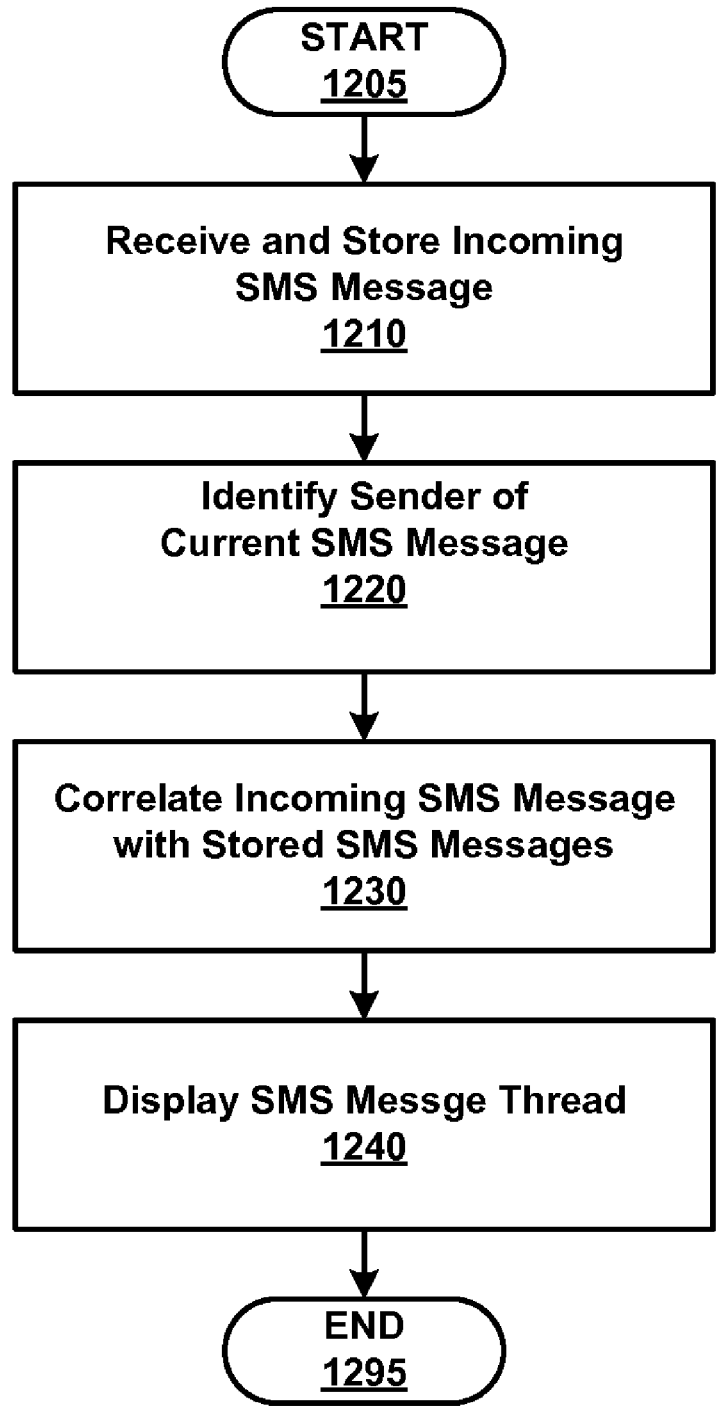
FIG. 12 is a flow chart illustrating the method of SMS threading to include an incoming message according to one embodiment of the present invention.

FIG. 12 is a flow chart illustrating the method of SMS threading 1200 to include an incoming message according to one embodiment of the present invention. The threading module 440 in this case initializes 1205 in response to the SMS database receiving an incoming message such as shown in FIG. 16.

The threading module 400 identifies 1320 the sender of the incoming message from a source address 810 in the SMS packet or as indicated by the SMS message database 410. As with an outgoing message, identifying 1320 may be based on a unique first or second identifier.

The threading engine 430 correlates 1230 the incoming message with previous messages according to incoming SMS message rules and outputs the resulting thread to the SMS application 440. An advantage of having separate incoming and outgoing rule sets is that the incoming rule set can be configured to contain more restrictions than outgoing threading to prevent unnecessary and unsolicited message threads. The SMS application 440 displays 1240 the SMS thread to the user as described above.

Figure 13:
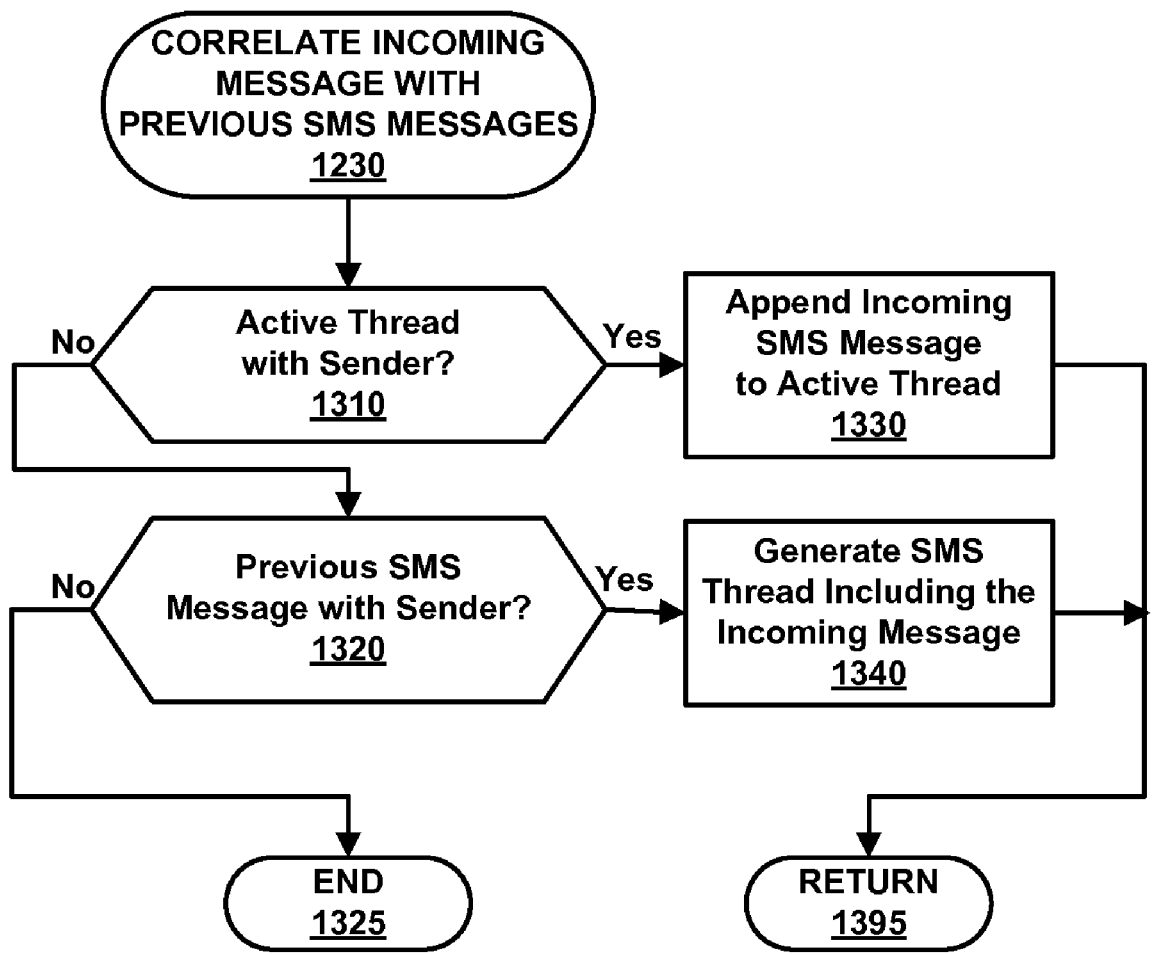
FIG. 13 is a flow chart illustrating the method of correlating an incoming message with an SMS thread according to one embodiment of the present invention.

FIG. 13 is a flow chart illustrating the method of correlating 1230 an incoming message with an SMS thread according to one embodiment of the present invention. The threading engine 430 determines 1310 whether there is an active thread with the outgoing message's receiver by checking the list of active threads 800. If there is an active thread, the threading engine 430 appends 130 the incoming SMS message to the active thread.

If there is no an active thread, the threading engine 430 determines 1320 whether there are previous SMS messages with the sender. Accordingly, the threading engine 430 checks the SMS message database 410 to identify previous messages based on either the first or second identifier. If there are previous messages, the threading engine 430 generates 1340 an SMS thread including the incoming message and related messages as described. If there are no previous messages with the sender, the process ends 1325

Figure 14:
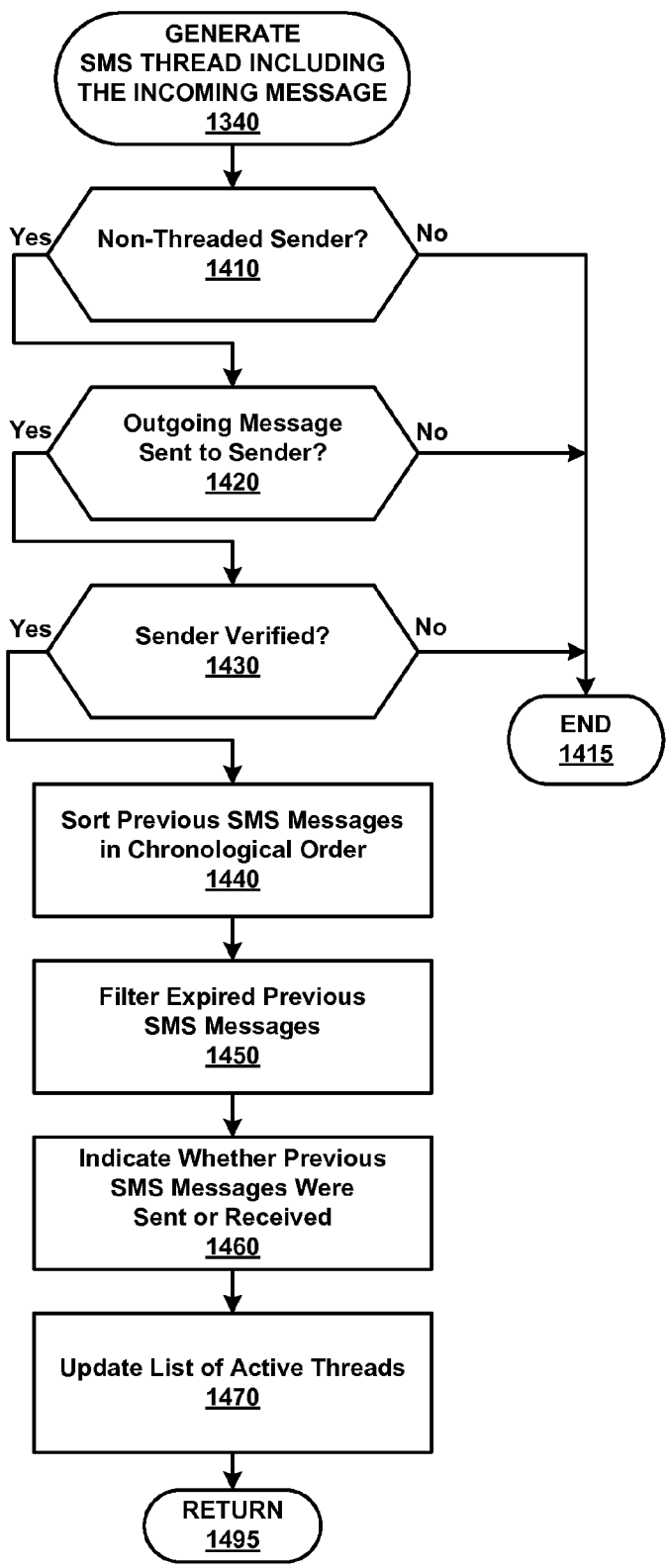
FIG. 14 is a flow chart illustrating the method of generating an SMS thread to include the incoming message according to one embodiment of the present invention.

FIG. 14 is a flow chart illustrating the method of generating 1340 an SMS thread to include the incoming message according to one embodiment of the present invention. In one embodiment, the threading engine 430 performs these tasks by implementing the threading rules from the incoming SMS message rules 520. Again, the present rule set is for illustrative purposes only.

In one embodiment, the threading engine 430 determines 1510 whether the sender is a non-threaded sender. If the sender is a non-threaded sender, the process ends 1415. If the sender is not a non-threaded sender, the threading engine 430 determines 1420 whether a previous outgoing message was sent to the sender. If a previous outgoing message was not sent to the sender, the process ends 1415.

If a message was sent to the sender, the threading engine 430 sorts 1440 the previous SMS messages in chronological order as described. In one embodiment, the threading engine 430 then filters 1450 expired SMS messages and updates 1470 the list of active threads 800.

FIG. 15 is a block diagram illustrating an example electronic communication 1500 device according to one embodiment of the present invention. The electronic communication device 1500, such as a GSM or CDMA cell phone, comprises a transceiver 1510, a SIM (Subscriber Identity Module) card 1520, a processor 1530, an input/output controller 1550, and a memory 1540 each coupled in communication with a conventional bus 1599.

The transceiver 1510 provides the transmission and reception of signals carrying SMS messages in SMS data packets 600 through a carrier frequency. The transceiver 1510 may be an RF (Radio Frequency), a Bluetooth, an IEEE 802.11-type, a USB (Universal Serial Bus) or an IEEE 1394-type transceiver, or any other transceiver capable of transmitting and receiving signals carrying SMS messages.

The SIM card 1520 provides user account information to log on to a carrier server. Responsive to an event such as power-up or reset, the SIM card 1520 securely provides user profile information for access to the carrier server. The SIM card 1520 may be a compact flash or other type of memory capable of storing a user profile.

The processor 1530 executes instructions and manipulates data necessary for SMS message threading. The processor 1530 may be a microprocessor such as an ARM processor by ARM, Inc., a Pentium 4® by Intel Corp. or an Athlon XP® by Advanced Micro Devices, an ASIC, a FPD (Field Programmable Device), a microcontroller, or any other device capable of executing instructions and manipulating data.

The input/output controller 1550 receives outgoing messages from and sends thread display information. The input/output controller 1550 may further comprise an audio/video interface, interface drivers, a set of input and/or output buffers, and/or microcode for interrupts. The input/output controller 1550 may be implemented in hardware, software, or a combination. The input/output controller 1550 is also capable of servicing other input/output or peripheral devices.

The input/output controller 1550 is coupled to a display 1560. The display 1560 receives and displays processed video from the input/output controller 1550. The display 1560 is, for example, a monitor, such as an LCD or plasma type, a television, or any other type of display device capable of displaying message threads. The display 1560 may be integrated with the device 110 or separate.

The input/output controller 1550 is also coupled to a keypad 1570. The keypad 1570 receives messages and control commands from the user and outputs to the input/output controller 270. The keypad 1570 is, for example, a 'QWERTY' keyboard, a number pad, a graffiti module, a touch screen, a combination or any other input device capable of receiving user text and commands. The 'QWERTY' keyboard may be mechanically adapted to use on a mobile device. Additionally, they keypad 1570 works in combination with software that provides text shortcuts for faster text entry.

The memory 1540 stores the program code executed by the processor to thread messages such as the threading module 1542. The memory 1540 may be a non-volatile type persistent memory such as a hard disk, a compact flash, or an EEPROM. The memory 1540 may be also be a volatile type such as a random access memory, a buffer, a cache, a register, a combination of non-volatile and volatile memory, or other device capable of storing instructions and data. The memory 1540 may also be a single storage device or a system of storage devices. In one embodiment, the memory 1540 also includes a phone book to store user contacts, phone numbers, SMS addresses, e-mail addresses, etc.

FIG. 16 is a block diagram illustrating an example system 1600 for transmitting SMS messages. The system 1600 comprises electronic communication devices 1610*a-d* coupled to an SMS network 1655.

The electronic communication devices 1610 correlate messages into threads for display to a user. The electronic communication devices 1610 exchange messages with each other through the SMS network 1655. The electronic communication devices 1610 provide the described user interface to display messages to the user and also to input new messages. The electronic communication devices 1610 may comprise a PDA (Personal Desktop Assistant) such as the Palm Pilot, an IP or cellular telephone, a hybrid PDA/cellular telephone device such as the Treo 600 by Handspring, a PC (Personal Computer), a network appliance, a mobile network device, an SMS device or any other device capable of sending and receiving messages with the SMS network 1655.

The SMS network 1655 comprises various interconnected network devices providing communication pathways for SMS messages exchanged between SMS devices 1610. In one embodiment, the SMS network 1655 comprises SMSCs that forward SMS packets 800 from the electronic communication devices 1610 to other components within the SMS network 1655 and other electronic communication devices 1610. In another embodiment, the SMS network 1655 comprises a gateway to interface with alternative networks and an alternative network such as those on an IP network. An electronic communication device 1610 such as a PDA can thus exchange SMS messages with a PC. In another embodiment, the system 1600 comprises an MMS or other type of messaging network for which the electronic communication devices 1600 thread messages.

In sum, a system and method provide message threading for stored SMS messages. The threading engine 430 identifies relationships between SMS messages by applying a set of threading rules responsive to an electronic communication device sending or receiving an SMS or other type of message.

The above description is included to illustrate the operation of the preferred embodiments and is not meant to limit the scope of the invention. The scope of the invention is to be limited only by the following claims. From the above discussion, many variations will be apparent to one of ordinary skill in the art that would yet be encompassed by the spirit and scope of the invention.

We claim:

1. A method for displaying a plurality of related SMS (Short Message Service) messages comprising:
reviewing a plurality of SMS messages associated with a first party;

determining, through a device, whether to thread one or more SMS messages from the plurality of SMS messages into an SMS message thread by applying a set of incoming SMS message rules to incoming SMS messages, the set of incoming SMS message rules preventing threading of an incoming SMS message originating from a commercial entity, and applying a set of outgoing SMS message rules to outgoing SMS messages, the set of outgoing SMS message rules associating an outgoing SMS message with one or more threads including one or more SMS messages, wherein the outgoing SMS message rules are different from the incoming SMS message rules and the one or more SMS messages are also associated with a second party; and outputting the SMS message thread displaying a relationship between two or more SMS messages.

2. The method of claim 1, wherein the determining whether to thread further comprises:

searching the one or more SMS messages based on a first identifier associated with the second party.

3. The method of claim 2, wherein the first identifier comprises one from the group of a telephone number and an SMS address.

4. The method of claim 1, wherein the first party is a receiver of one of the second party SMS messages and the second party is the sender.

5. The method of claim 1, further comprising:

receiving a current SMS message from the second party; and determining whether to thread the current message into the SMS message thread.

6. The method of claim 1, wherein the set of incoming SMS message rules or the set of outgoing SMS message rules includes a rule to prevent threading if the second party is a non-threaded party.

7. The method of claim 1, wherein the set of incoming SMS message rules or the set of outgoing SMS message rules includes a rule to verify the second party as a threaded party.

8. The method of claim 7, wherein the rule to verify the second party verifies the second party if the second party matches an entry in a phone book.

9. The method of claim 1, wherein the outputting the SMS message thread comprises:

outputting the SMS message thread to an SMS application for display in a threaded format.

10. The method of claim 9, wherein outputting further comprises:

formatting messages originated by the first party in a first display format; and formatting messages originated by the second party in a second display format.

11. The method of claim 1, wherein the commercial entity comprises a known spammer.

12. A device for displaying a plurality of related SMS (Short Message Service) messages, comprising:

a SMS message database to store a plurality of SMS messages associated with a first party;

a threading module, coupled in communication with the SMS message database, the threading module determining whether to thread one or more SMS messages from the plurality of SMS messages into an SMS message thread, the one or more SMS messages associated with a second party, and to output the SMS message thread; and a threading rule database including a set of incoming SMS message rules applicable to incoming SMS messages, the set of incoming SMS message rules preventing threading of an incoming SMS message originating from a commercial entity, and a set of outgoing SMS message rules applicable to outgoing SMS messages, the set of outgoing SMS message rules associating an outgoing SMS message with one or more threads including one or more SMS messages, wherein the set of outgoing SMS message rules are different from the set of incoming SMS message rules.

13. The device of claim 12, wherein the threading module searches an SMS message database based on a first identifier associated with the second party.

14. The device of claim 13, wherein the first identifier comprises a telephone number or an SMS address.

15. The device of claim 12, wherein the threading module retrieves a second identification for the second party, wherein the SMS message thread comprises SMS messages associated with both the first and second identifications.

16. The device of claim 12, wherein the threading module receives a current SMS message from the second party, and determines whether to thread the current message into the SMS message thread.

17. The device of claim 12, wherein the threading module further comprises a threading engine to apply the set of incoming SMS message rules to incoming SMS messages and the set of outgoing SMS message rules to outgoing SMS messages.

18. The device of claim 12, wherein the set of incoming SMS message rules define thread characteristics, the set of incoming SMS message rules including a rule to prevent threading if the second party is a non-threaded party.

19. The device of claim 18, wherein the threading module further comprises a threading engine to apply the set of incoming SMS message rules to define thread characteristics, wherein the set of incoming SMS message rules including a rule to verify the second party as a threaded party.

20. The device of claim 19, wherein the rule to verify the second party verifies the second party if the second party matches an entry in a phone book.

21. The device of claim 12, wherein the set of incoming SMS message rules or the set of outgoing SMS message rules includes a rule to define the order in which SMS messages are threaded.

22. The device of claim 12, wherein the threading module outputs the SMS message thread to an SMS application for display in a threaded format.

23. The device of claim 12, wherein the commercial entity comprises a known spammer.

24. A computer product, comprising:

a non-transitory computer-readable medium having computer program instructions and data embodied thereon for display a plurality of related SMS (short message service), comprising:

reviewing a plurality of SMS messages associated with a first party;

determining whether to thread one or more SMS messages from the plurality of SMS messages into an SMS message thread by applying a set of incoming SMS message rules to incoming SMS message, the set of incoming SMS message rules preventing threading of an incoming SMS message originating from a commercial entity, and applying a set of outgoing SMS message rules to outgoing SMS messages, the set of outgoing SMS message rules associating an outgoing SMS message with one or more threads including one or more SMS messages, wherein the outgoing SMS message rules are different from the incoming SMS message rules and the one or more SMS messages are associated with a second party; and outputting the SMS message thread.

25. The computer product of claim 24, wherein the determining whether to thread comprises:

searching the one or more SMS messages based on a first identifier associated with the second party.

26. The computer product of claim 25, wherein the first identifier comprises a telephone number or an SMS address.

27. The computer product of claim 24, further comprising:

retrieving a second identification for the second party, wherein the SMS message thread comprises SMS messages associated with both the first and second identifications.

28. The computer product of claim 24, wherein the incoming SMS message rules or the outgoing SMS message rules include a rule to prevent threading if the second party is a non-threaded party.

29. The computer product of claim 24, wherein the incoming SMS message rules or the outgoing SMS message rules include a rule to verify the second party as a threaded party.

30. The computer product of claim 29, wherein the rule to verify the second party verifies the second party if the second party's unique identification matches an entry in a phone book.

31. The computer product of claim 24, wherein the outputting the SMS message thread comprises:

outputting the SMS message thread to an SMS application for display in a threaded format.

32. The computer product of claim 24, wherein the commercial entity comprises a known spammer.

* * * * *

UNITED STATES PATENT AND TRADEMARK OFFICE
CERTIFICATE OF CORRECTION

| | | |
|---|---|---|
| PATENT NO. | : 8,046,014 B2 | Page 1 of 1 |
| APPLICATION NO. | : 12/616091 | |
| DATED | : October 25, 2011 | |
| INVENTOR(S) | : Richard J. Donald et al. | |

It is certified that error appears in the above-identified patent and that said Letters Patent is hereby corrected as shown below:

In column 12, line 52, Claim 24, delete "display" and insert -- displaying --, therefor.

Signed and Sealed this
Tenth Day of July, 2012

David J. Kappos
*Director of the United States Patent and Trademark Office*